Patented Oct. 22, 1935

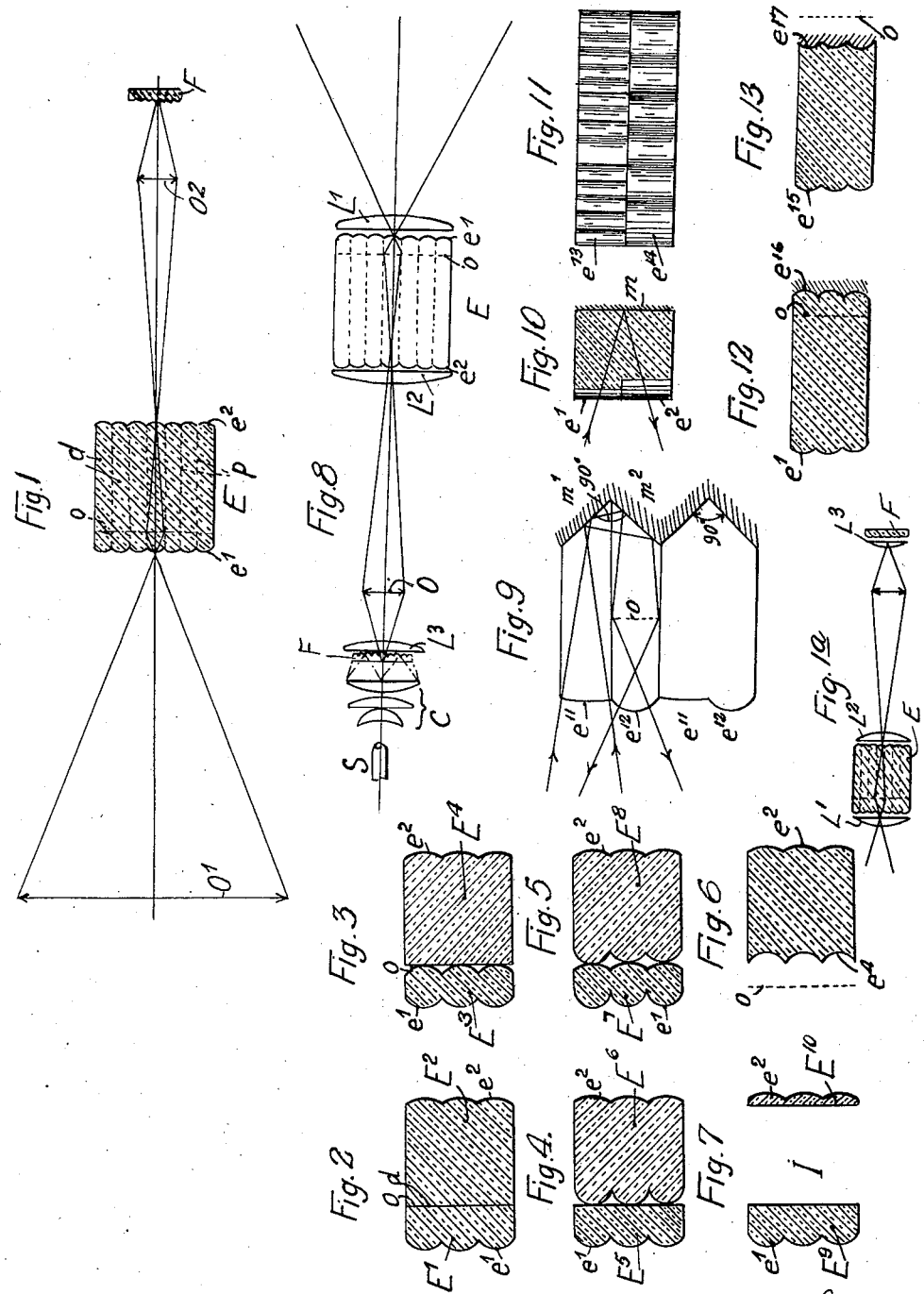

2,018,592

UNITED STATES PATENT OFFICE 2,018,592

CINEMATOGRAPHY IN RELIEF

Albert Arnulf, Paris, France

Application December 5, 1932, Serial No. 645,784
In France December 4, 1931

5 Claims. (Cl. 88—16.6)

(Granted under the provisions of sec. 14, act of
March 2, 1927; 357 O. G. 5)

This invention relates to the production of relief effects in cinematography by the use of lenticular films. On projection, a large amount of light is required and by employing the screen of this invention to receive an image which is again photographed on the lenticular film, it is possible to employ an objective of large aperture to form the image on the screen. This provides an image of the object from wide angles and when the image is formed on the lenticular screen and the recorded image is projected by means of a light device, satisfactory relief effects are obtained.

In the accompanying drawing wherein the invention is illustrated:—

Figure 1 is a diagrammatic view partly in section showing the invention employed for taking photographs.

Fig. 1a is a view similar to Fig. 1 illustrating a modification of the invention.

Figs. 2 to 7 are fragmentary sectional views of modified forms of the lenticulated optical device forming part of the invention.

Fig. 8 is a view similar to Fig. 1 showing the invention applied to an arrangement for projecting the recorded image.

Fig. 9 is a diagrammatic view partly in section showing a further modification of the lenticulated optical device.

Figs. 10 and 11 are transverse sectional and front elevation views of a further modification of the optical device, and, Figs. 12 and 13 are sectional views of two further modifications of the optical device.

The improved optical system as illustrated in Fig. 1 adapted for photographic recording comprises an objective $O^1$ of wide aperture, and a lenticular optical device E and a photographic objective $O^2$ for forming an image on the lenticular film designated at F. The principal novel feature of the system is the lenticulated optical device E.

The device E is substantially constituted by a block of transparent and homogeneous material provided on both its faces with cylindrical lenticulations $e^1$, $e^2$ having widths proportional to those of the lenticulations of the film F and axes parallel to those of the film. The sections of the lenticulations may be circular or they may have any other suitable shape for correcting aberrations. The lenticulations are arranged opposite to each other, that is to say, each lenticulation $e^1$ is arranged opposite to a corresponding lenticulation $e^2$, both lenticulations being disposed on an axis parallel with the main axis of the entire optical system. Each of the front lenticulations $e^1$ forms the image of the objective $O^1$ within the block in the plane thereof designated at o. The rear lenticulations $e^2$ pick up this image at o and project it on the pupil of an objective $o^2$ arranged in front of the lenticulated film f and the opening of which is related to the opening ratio of the lenticulations. As a result, each line of the objective $o^1$ parallel to the lenticulated portion has a corresponding image on the objective $O^2$.

The objective $O^2$ forms an image of the image at o on the film F and there is thus obtained on said film an image of the scene to which the objective is exposed which is composed of a large number of juxtaposed bands, each band comprising an infinity of images and each of these images corresponding to a different line having a base equal to the diameter of the objective $O^1$.

This objective $O^1$ may consist of a simple or composite lens or a mirror of large diameter projecting the image of the scene to be recorded on the optical device E.

For cases where the fields are not large the above described system may be employed while for photographing a large scene, collecting, spherical, cylindrical or double focus lenses $L^1$, $L^2$, and $L^3$ are placed in contact with the lenticulations $e^1$ and $e^2$ of the optical device E and with the lenticulations of the film F as shown in Fig. 1a. The power of these collecting lenses in the sections situated in the plane of the figure, will be such that the focus of $L^1$ coincides with $O^1$, the focus of $L^2$ coincides with $O^2$ and the focus of $L^3$ also coincides with $O^2$.

The above devices described with reference to Fig. 1a does not necessitate any accurate adjustment, in particular, and there is no need to take into account the size of the image obtained on the film.

The ratio between the focal distances of the front and rear elements of the optical device, that is to say, the radii of the curvature of the apex of the lenticulations is determined by the magnitude of the relief effect to be obtained. This ratio is equal to the ratio between the diameter of the objective $O^2$ and the diameter of the objective $O^1$, multiplied by the ratio between the distance separating the objective $O^1$ from the screen at o, and the distance separating the screen from the objective $O^2$. In general, the width of the lenticulations $e^1$ is so chosen that the image of the objective $O^1$ is equal to this width, thus completely determining $e^1$ and therefore $e^2$.

It is necessary for satisfactory results, that the rays passing through all portions of the objective O¹ should enter the objective O² and this result can be obtained by the two following means: First, a very thin screen is arranged in the plane o of the images and is designated at d in Fig. 2. In this case the optical device E may be composed of two parts E¹ and E² of different thickness and lenticulated on their outer faces, the adjacent faces of the parts being plane and one of them being ground. These plane faces are arranged together with a screen interposed between them. This arrangement also presents the advantage of utilizing, without collecting lenses, the rays disposed in a plane perpendicular to the plane of the figure and passing through the optical axis.

Second, a refringent surface is arranged in the image plane o as illustrated in Fig. 3, this surface acting as a collecting lens. In this case the optical device is divided into two parts E³ and E⁴ and the rear face of the part E³ is provided with intermediate lenticulations as indicated and disposed in the plane o, the surface being convexed and having axes parallel to the lenticulations e¹ of the front face with the same width. The front face of the rear part E⁴ is formed with a plane front surface disposed adjacent the lenticulated rear surface of the part E³ or it may also be lenticulated.

Fig. 4 illustrates a further modification similar to Fig. 3 except that the intermediate lenticulations are formed on the front face of the rear part E⁶ and the rear face of the front part E⁵ is plane.

Fig. 5 illustrates a modification in which the adjacent faces of both parts E⁷ and E⁸ are lenticulated.

It is also possible, as suggested in Fig. 6, to provide concave lenticulations as indicated at e⁴ provided that the image formed at o by the lenticulations e¹ is located in the image plane of the lenticulations e². This device reduces the width and the weight thereof and reverses the relief effect as compared with the device provided with the front concave lenticulations.

The weight of the optical device E can be diminished by providing two spaced parts E⁹ and E¹⁰ provided, respectively, with the lenticulations e¹ and e², thereby providing an air space I between the two parts.

A projecting apparatus embodying the same principles of the invention as above described with regard to the recording apparatus is illustrated in Fig. 8 and comprises the lenticulated optical device E the construction of which is identical with the corresponding part in Fig. 1a. The source of light for projection purposes is indicated at S and between the latter and the film F is arranged the usual condensing lens C. The condensing lens is of such form that the image of the source of light S uniformly and completely covers the projection objective O. The lenticulations of the film F face the projection objective O and the latter projects the image on the optical device E. The lenticulations e² form the image at o, the lenticulations e¹ having such curvature that one of the focal planes thereof lies in the plane o and the other the desired distance from the projecting machine.

As described in connection with Fig. 1a collecting lenses may be employed, that is to say, a collecting lens L³ is disposed immediately adjacent the film F, the focus thereof being upon the objective O, the collecting lens L² is disposed adjacent the lenticulations e², the focus of L² being also on the objective O, and a collecting lens L¹ adjacent the lenticulations e¹, the focus of L¹ being approximately at the center of the projection hall. In the case of a large projection screen instead of using lenses L¹ and L², lenticulations may be distributed on the base surfaces e¹ and e² which will be of cylindrical or spherical shape or of any other shape instead of being plane. It will always be necessary to lenticulate one of the faces of the optical device at right angles to the length of the main lenticulations or to place a diffusion screen or surface in the image plane o.

In the latter case the radius and the nature of the material of the portion e¹ will be so chosen that the angle of vision in the hall for each elementary image does not exceed 30°. In fact, on either side of this 30° zone there exist other exactly juxtaposed zones of 30° due to the fact that the element e² of the optical device supplies in these zones, not the rays relating to the image as corresponding thereto but those relating to the images e¹ and e² juxtaposed at o and coming from adjacent lenticulations. A field of vision of 180° is thus obtained, but never more then 90° of the same will be used owing to the distortion of the images resulting from the angle of view of the spectators relatively to the screen.

In the projection apparatus the lenticulated optical device may take the several forms above described as will be understood.

The projection of pictures according to the invention is simple and does not necessitate extensive modification of conventional picture projection apparatus other than, in certain cases, placing a spherical or collecting lens against a film. The only adjustment required consists in setting the lenticulations of the optical device E parallel to those of the film and when this adjustment has been made it is permanent.

Instead of utilizing a lenticulated optical device E of full transparency, the construction of the device may be modified so as to operate by reflection. Such an arrangement is illustrated in Figure 9 in which e¹¹ indicates the inlet lenticulations and e¹² the outlet lenticulations arranged on the same face of the lenticular optical device. The opposite side of said device is formed by the oppositely inclined facets m¹ and m². The rays of light passing through the lenticulations e¹¹ which are of less curvature than the other lenticulations are reflected by the reflecting surface m¹ inclined at 45° onto the other reflecting surface m² arranged opposite the lenticulations e¹². The image located in the plane o of the objective is disposed at the focus of the lenticulations e¹² of greatest curvature which distributes the rays as previously described. The surfaces m¹ and m² are rendered highly reflective and for this purpose they may be silvered.

The lenticulations e¹¹ of greatest curvature are lenticulated or of wave-like form in a direction perpendicular to the main lenticulations or, if desired, both lenticulations e¹¹ and e¹² may be so formed.

A further modification of the invention is illustrated in Figs. 10 and 11 in which the optical device is composed of horizontal strips all having the width of the optical device and of suitable and equal height, certain of the strips having lenticulations e¹³ of small radius and other strips having lenticulations e¹⁴ of larger radius, the groups of lenticulations being alternately arranged in succession. The rear face m is plane and reflecting. According to the forms of the invention illustrated in Figs. 9 to 11, the projection apparatus is arranged at a higher level than the optical device and the observer is disposed at a lower level than said optical device so that the rays of light passing through the upper lenticulations and reflected by the mirror m are reflected through the lower lenticulations which latter is also provided with additional lenticulations.

Further modifications of the invention are illustrated in Figs. 12 and 13 in which the lenticulated optical device is composed of lenticulated plates of the form illustrated in these figures. The elements $e^{15}$ form an image at o of the projection objective and the elements $e^{16}$ are concave reflecting elements in one case (Fig. 12) and convex reflecting elements $e^{17}$ in the other case (Fig. 13), distributing the image o in different directions. It may be advantageous that the image o should not be quite at the focus of the reflecting elements, the latter reflecting from a point of o, not a parallel bundle of rays but slightly divergent rays. It is not possible to arrange a diffusing surface at o and therefore the elements $e^{16}$ and $e^{17}$ are provided with lenticulations at right angles to the main lenticulations.

What I claim is:—

1. In a device for taking views and projecting cinematographic films in relief, a lenticulated film having equidistant cylindrical lenticulations, a lens whose pupil situated with respect to the film is conjugated with the emulsion layer of the said film relative to the lenticulations of this film, an optical device conjugate with the lens having two systems of equidistant cylindrical lenticulations parallel to those of the lenticulated film, the lenticulations for the two systems being of the same width but having a radius of different curvature and arranged in such a manner that the images given by the first system are in a plane from which the second system gives an image suitably placed in consideration of the optical element which follows the same, the radius of inlet lenticulations being such that the image of the said lens which furnishes it has a width which is not larger than the width of the lenticulations, and said lenticulations of the film and optical device being mutually proportional for each lenticulation of one to receive light from a corresponding lenticulation of the other.

2. In a device for taking views and projecting cinematographic films in relief, a lenticulated film having equidistant cylindrical lenticulations, a lens whose pupil situated with respect to the film is conjugated with the emulsion layer thereof relative to the lenticulations of the said film, on optical device conjugate with the lens having on each of its front and rear faces a system of equidistant cylindrical lenticulations parallel to those of the lenticulated film, the lenticulations for the two faces being of the same width but having a radius of different curvature and arranged in such a manner that the images given by the first system are in a plane from which the second system gives an image suitably placed in consideration of the optical element which follows the same, the radius of inlet lenticulations being such that the image of the said pupil which furnishes it has a width which is not larger than the width of the lenticulations, and said lenticulations of the film and optical device being mutually proportional for each lenticulation of one to receive light from a corresponding lenticulation of the other.

3. In a device for taking views and projecting cinematographic films in relief, a lenticulated film having equidistant cylindrical lenticulations, a lens whose pupil situated with respect to the film is conjugated with the sensitive layer thereof relative to the said lenticulations, an optical device conjugate with the lens having two systems of equidistant cylindrical lenticulations parallel to those of the lenticulated film, the lenticulations of the two systems being of the same width but having a radius of different curvature and arranged in such a manner that the images given by the first system are in a plane from which this second system gives an image suitably placed in consideration of the optical element which follows it, the radius of inlet lenticulations being such that the image of the said pupil has a width which is not larger than the width of the lenticulations, means for receiving this image formed by the inlet lenticulations, and said lenticulations of the film and optical device being mutually proportional for each lenticulation of one to receive light from a corresponding lenticulation of the other.

4. In a device for projecting cinematographic films in relief, a lenticulated film having equidistant cylindrical lenticulations, a lens whose pupil situated with respect to the film is conjugated with the emulsion layer thereof relative to the said lenticulations, an optical device conjugate with the lens, two systems of lenticulations on one of the faces of this optical device, a reflecting system formed on the other face, the lenticulations for the two systems being of the same width but having a radius of different curvature and arranged in such a manner that the images given by the first system are in a plane from which the second system gives an image suitably placed in consideration of the optical element which follows it, the radius of inlet lenticulations being such that the image of the said pupil which it furnishes has a width which is not larger than the width of the lenticulations, and said lenticulations of the film and optical device being mutually proportional for each lenticulation of one to receive light from a corresponding lenticulation of the other.

5. In a system for taking views and projecting cinematographic films in relief, a lenticulated film having equidistant cylindrical lenticulations, a lens whose pupil situated with respect to the film is conjugated with the emulsion thereof relative to the lenticulations of said film, an optical device having two systems of equidistant lenticulations parallel to those of the film, the lenticulations for the two systems having radii of different curvature and arranged in such a manner that the first system is conjugated with the lenticulations of the film relative to the lens and that the images of the pupil of the lens situated with respect to the optical device and given by the first system are in a plane from which the second system gives an image suitably placed in consideration of the optical element which follows the same, the radius of the inlet lenticulations being such that the images of the pupil of the said lens which they furnish have a width which is not larger than the equidistance of these images, the relation of the widths of the lenticulations of the film and optical device being chosen in such a manner that each lenticulation of one of these two elements receives the light from a corresponding lenticulation of the other.

ALBERT ARNULF.